United States Patent [19]

Baranski

[11] Patent Number: 5,012,196
[45] Date of Patent: Apr. 30, 1991

[54] CAPACITANCE SENSOR ARRANGEMENT
[75] Inventor: Jan Baranski, Nedlands, Australia
[73] Assignee: The University of Western Australia, Australia
[21] Appl. No.: 425,385
[22] Filed: Oct. 20, 1989

Related U.S. Application Data

[63] Continuation of Ser. No. 126,457, Nov. 30, 1987, abandoned.

[30] Foreign Application Priority Data

Dec. 5, 1986 [AU] Australia .............................. PH9363

[51] Int. Cl.$^5$ ............................................ G01R 27/26
[52] U.S. Cl. ..................................... 324/662; 324/670; 324/690
[58] Field of Search ............... 324/685, 661, 664, 665, 324/662, 690, 669, 670; 331/109, 182, 183; 330/226, 272

[56] References Cited

U.S. PATENT DOCUMENTS

| | | |
|---|---|---|
| 2,887,651 | 5/1959 | Piip . |
| 3,217,204 | 11/1965 | Nance . |
| 3,234,461 | 2/1966 | Trent et al. . |
| 3,255,405 | 6/1966 | French . |
| 3,381,217 | 4/1968 | Williamson et al. . |
| 3,407,352 | 10/1968 | Smith . |
| 3,473,111 | 10/1969 | Leersnijder et al. . |
| 3,624,541 | 11/1971 | Lundstrom ........................ 324/668 |
| 3,815,016 | 6/1974 | Nix et al. . |
| 3,824,497 | 7/1974 | Schwerdt ........................... 331/183 |
| 3,967,064 | 6/1976 | Sigworth . |
| 4,001,718 | 1/1977 | Wilson et al. . |
| 4,016,490 | 4/1977 | Weckenmann et al. .......... 324/61 R |
| 4,042,876 | 8/1977 | Visioli, Jr. . |
| 4,160,204 | 7/1979 | Holmgren et al. . |
| 4,219,740 | 8/1980 | Little . |
| 4,243,946 | 1/1981 | Wang ................................. 330/226 |
| 4,302,727 | 11/1981 | Iwamatsu ........................... 330/226 |
| 4,333,052 | 6/1982 | Schmall . |
| 4,339,709 | 7/1982 | Brihier ............................... 324/61 R |
| 4,345,167 | 8/1982 | Calvin ................................ 324/61 R |
| 4,633,249 | 12/1986 | Sasaki ................................ 324/61 R |
| 4,675,670 | 6/1987 | Lalonde et al. ................... 324/61 R |
| 4,686,531 | 8/1987 | Shambroom et al. ............ 324/61 R |
| 4,706,020 | 11/1987 | Viertl et al. . |

FOREIGN PATENT DOCUMENTS

| | | |
|---|---|---|
| 35303/84 | 9/1984 | Australia . |
| 32064 | 2/1985 | Australia . |
| 61-80086 | 4/1986 | Japan . |

Primary Examiner—Kenneth Wieder
Assistant Examiner—Maura K. Regan
Attorney, Agent, or Firm—Nixon & Vanderhye

[57] ABSTRACT

A capacitance sensor arrangement is used to determine the distance of an element such as a shearing handpiece from a surface such as the skin of a sheep. The arrangement processes data from one or more sensors which include a variable capacitor dependent on the distance, and provides an output voltage consistent with the distance, the output voltage being dependent on the voltage drop across a reference capacitor in the sensor circuit.

16 Claims, 2 Drawing Sheets

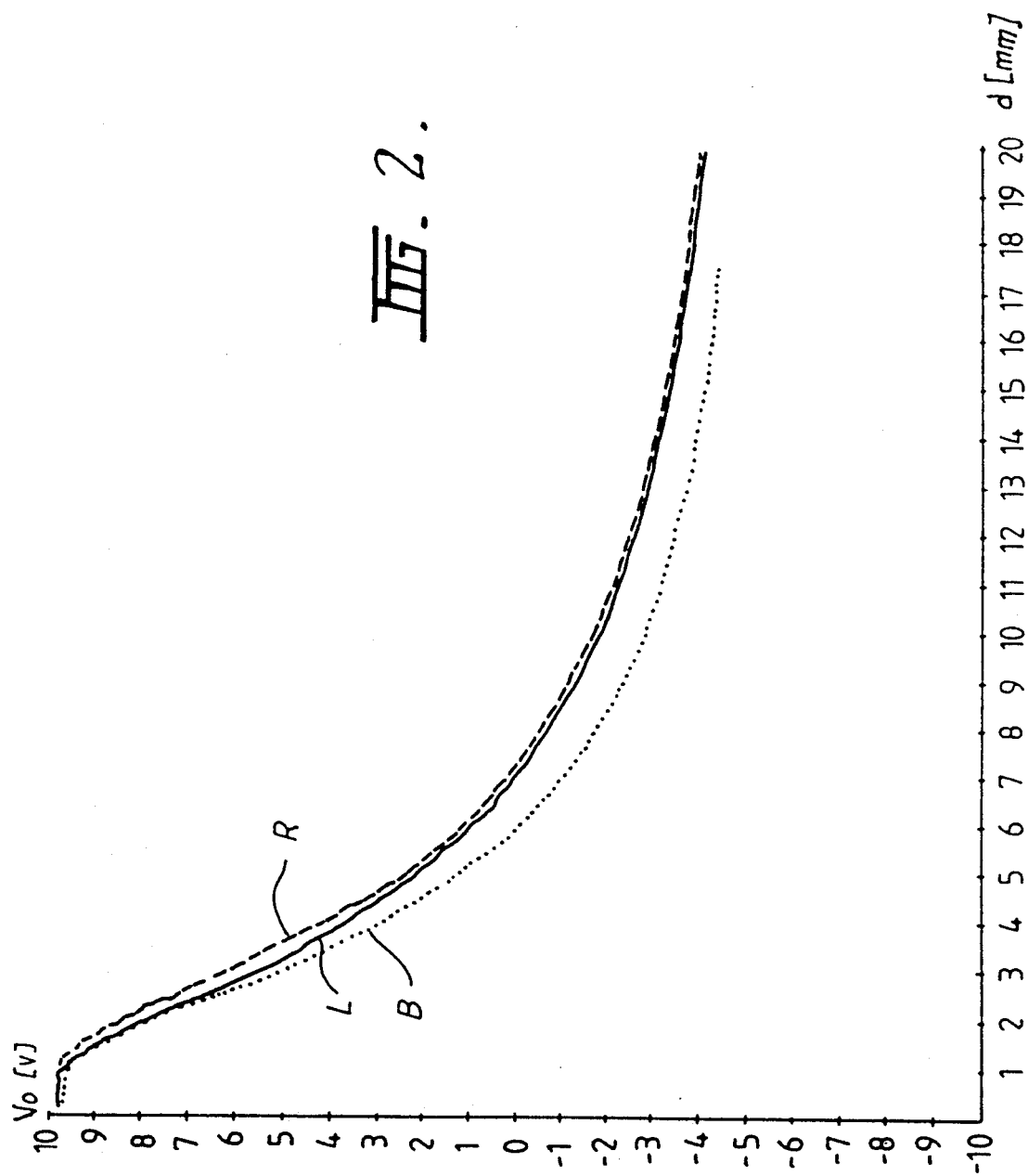

CAPACITANCE SENSOR ARRANGEMENT

This is a continuation of application Ser. No. 07/126,457, filed Nov. 30, 1987, now abandoned.

BACKGROUND OF THE INVENTION

Field of the Invention

This invention relates to a capacitance sensor for determining parameter values, and in particular relates to distance measuring in automated sheep shearing.

Description of the prior art

AU-A-32064/84 describes a capacitive sensing arrangement for use in sensing the position of a shearing head in an automated sheep shearing system.

There is described a capacitance sensor per se, an arrangement for locating sensors on a shearing handpiece, means for establishing the distance of the handpiece from the skin of a sheep, by processing information from the sensors.

BRIEF SUMMARY OF THE INVENTION

The present invention addresses itself to an arrangement for processing information from a number of sensors in a capacitive sensing arrangement, which arrangement may be seen as an alternative to the approach taken in AU-A-32064/84.

The invention provides a capacitance sensing arrangement for indicating the distance of an element from a surface, wherein the voltage drop across a reference capacitor, resulting from the location of sensing means at said distance from said surface, is processed to produce said indication.

The invention also provides a method of sensing the distance between an element and a surface, in which information from a capacitance sensor is processed to produce an indication of distance, the sensor consisting of or including a variable capacitor, the output voltage across a reference capacitor being used to obtain said indication of voltage.

Preferably, the distance is calculated by processing the sensor output voltage $V_{SL}$ calculated using the equation described hereinafter.

BRIEF DESCRIPTION OF THE DRAWINGS

FIG. 2 is a graph of voltage plotted against distance.

DESCRIPTION OF THE PRIOR ART

Figure 1:
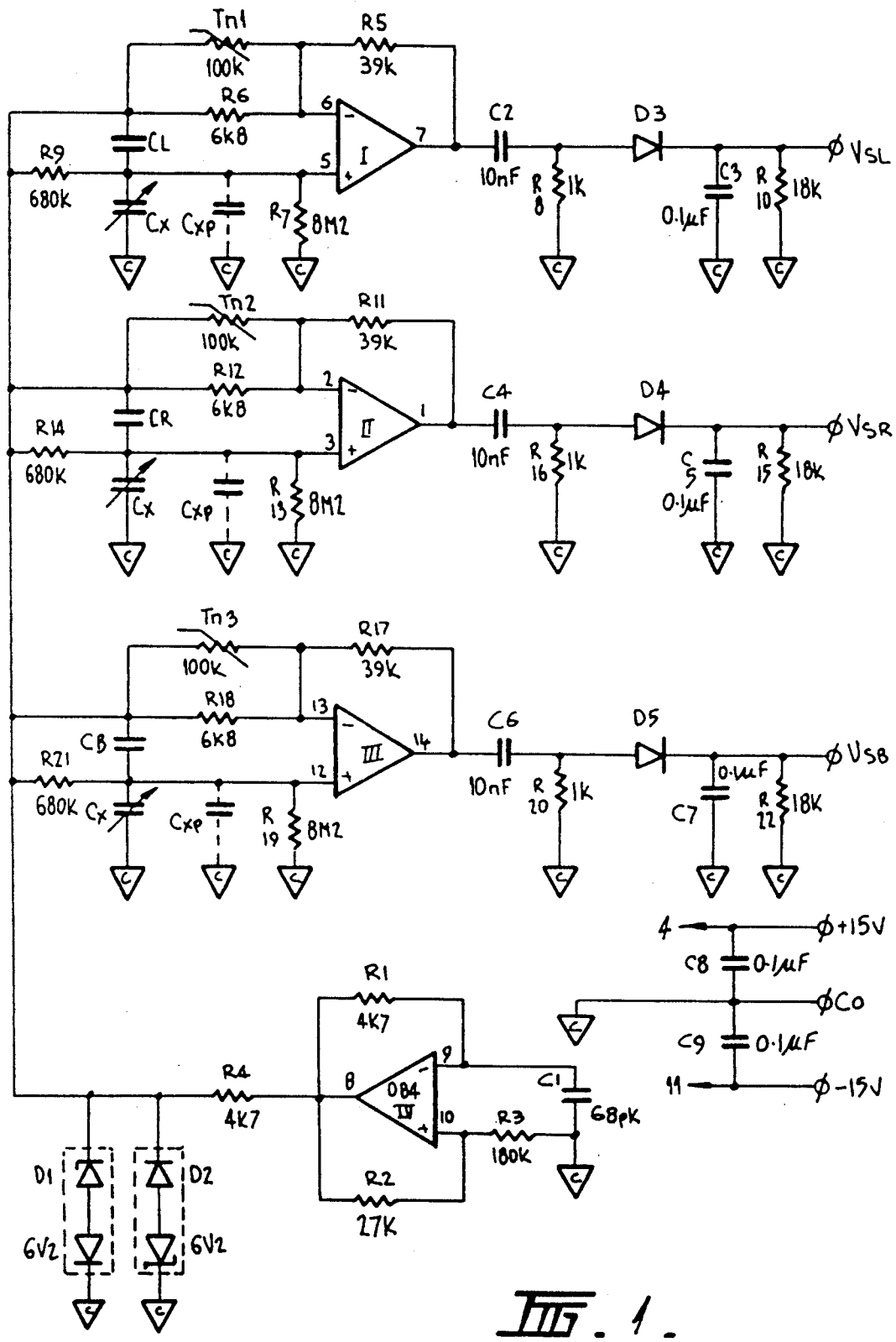
FIG. 1 is a circuit diagram of a capacitance sensor arrangement.

Referring firstly to FIG. 1, the circuit shown incorporates three sensors, a left sensor (SL) a right sensor (SR) and a rear sensor (SB). Each sensor may be of the form shown in FIG. 4 of AU-A-32064/84, and may be located respectively on the right, left and rear of a shearing cutter head.

The capacitance sensor system for measuring distance, in this case from a cutter head to the skin of a sheep, is based on a measurement of voltage drop across a reference capacitor.

The three sensors (SL, SR, SB) are powered from one local oscillator, which is built on an operational amplifier (IV) which is one element of a quad op-amp (084). With feedback components as shown in the circuit of FIG. 1, the oscillator produces a square wave having a frequency of approximately 190 kHz. The possible operating frequency range is limited in practice by the impedances of the capacitors and by the parameters of the operational amplifier.

The signal from the oscillator is stabilized by temperature compensated Zener diodes (D1,D2), preferably IN827 models. The amplitude is chosen experimentally for the best use of the output voltage swing of the other elements (I, II, III) of the measuring amplifier.

As an example, we shall only consider the left sensor channel (that for sensor SL). The signal from the oscillator is divided by R9, $C_L$, $C_{xp}$, $C_x$ and R.7 $C_L$ is the fixed reference capacitor, $C_{xp}$ is a fixed parasitic between the sensor plate and ground, $C_x$ is a variable capacitor dependent on the measured proximity, R7 is a bias resistor and R9 is a resistor added for stability of the amplifier (I).

The voltage drop across $C_L$ is amplified with a gain established by resistor R5 and resistor R6 together with thermistor Th1. The value of the R-T curve matched thermistor is chosen experimentally to compensate for the thermal drift of the rest of the circuit. The signal is then filtered to remove hum (C2, R8) and converted to D.C. (D3, C3 each a 5082-2811). Resistor R10 is used to control the response time of the converter.

Neglecting the influence of R9 and R7, the voltage across the capacitor $C_L$ is:

$$V_{CL} = V_{osc} \frac{C_{xp} + C_x}{C_{xp} + C_x + C_L}$$

If the gain of the amplifier (I) together with filter (C2,R8) is K, and the polarizing voltage of D3 is $V_p$, the sensor output voltage $V_{SL}$ is given by:

$$V_{SL} = K \times V_{osc} \frac{C_{xp} + C_x}{C_{xp} + C_x + C_L} - V_p$$

The typical free air voltage, when $C_x = 0$, is approximately +6 V and contact voltage approximately +11 V.

The sensor output voltage is further processed to calculate the proximity, that is, the distance between the cutter head and the sheep's skin. The on-board oscillator eliminates the need to carry the high frequency signal through parts of a robot control system of which the cutter head may be a part. The oscillator does not have to be individually stabilized; the thermistor compensates for the thermal drift of the output signal. The Op-amp used directly in the measuring circuit, and the filter, produce an improved signal to noise ratio.

I claim:

1. A capacitance sensing arrangement for indicating the distance of an object from a surface, including sensing means located in said object and oscillator means for generating an alternating signal Vosc, said sensing means being connected in an electrical circuit including a variable capacitor having a capacitance Cx dependent on said distance, a reference capacitor for providing a reference capacitance CL, circuit means for providing a polarizing voltage Vp, and means connected to said variable capacitor for producing an output voltage $V_S$ responsive to said variable and reference capacitances and to said polarizing voltage in accordance with the equation $$V_S = K_x V_{osc} \frac{C_{xp} + C_x}{C_{xp} + C_x + C_L} - V_P$$

where $K_x$ is the amplifier gain of said output voltage providing means, and $C_{xp}$ is a fixed parasitic capacitance between the circuit and ground, and means for calculating said distance from said sensor output voltage $V_S$.

2. The arrangement of claim 1, wherein there are three capacitive sensing means.

3. A capacitive sensing arrangement according to claim 2, wherein said three sensing means include a left-hand sensing means SL disposed in a left-hand sensing location, a right-hand sensing means SR disposed in a right-hand sensing location, and a rear sensing means SB disposed in a rear sensing location.

4. The arrangement of claim 1, further including means for calculating said distance from the sensor output voltage $V_s$.

5. A capacitance sensing arrangement according to claim 1, further including plural sensing means.

6. A capacitance sensing arrangement according to claim 1, wherein said arrangement includes a left-hand sensing means SL disposed in a left-hand sensing location, a right-hand sensing means SR disposed in a right-hand sensing location, a rear sensing means SB disposed in a rear sensing location, each said sensing means being coupled to said oscillator means for independently sensing said distance and producing a corresponding output signal $V_{SL}$, $V_{SR}$ and $C_{SB}$, respectively.

7. A capacitance sensing arrangement according to claim 6, wherein said oscillator means includes:
an operational amplifier generating a square wave at an output terminal thereof; and
a stabilizing circuit coupled to said operational amplifier square wave output, including a first zener diode D1 having a cathode operatively coupled to said operational amplifier output terminal and a second zener diode 6V2 having an anode operatively coupled to said operational amplifier output terminal.

8. A capacitance sensing arrangement according to claim 6, wherein said variable and reference capacitors of each of said sensing means are connected in series.

9. A capacitance sensing arrangement according to claim 6, wherein said oscillator means is co-located with said first sensing means, said second sensing means and said third sensing means.

10. A capacitance sensing arrangement as defined in claim 1 wherein said means connected to said variable capacitor for producing an output voltage $V_S$ includes an amplifier circuit responsive to the voltage drop across said reference capacitance for converting said voltage drop to a corresponding output signal.

11. A capacitance sensing arrangement according to claim 10, wherein said amplifier circuit includes a diode rectifier and a filter.

12. A capacitance sensing arrangement according to claim 10, wherein said output signals of each of said first, second and third sensing means comprise DC levels which vary substantially linearly with respect to the voltage drop across said corresponding reference capacitance.

13. A capacitance sensing arrangement according to claim 10, wherein said amplifier circuit includes means for compensating for thermal drift.

14. A capacitance sensing arrangement according to claim 13, wherein said thermal drift compensating means includes a thermistor.

15. A capacitance sensing arrangement as defined in claim 1, being a unitary sensing arrangement for indicating the distance of a shearing head from an animal skin.

16. A sensor arrangement as in a unitary capacitance sensor arrangement for indicating distance from animal skin, said arrangement comprising:
oscillator means for generating an alternating signal;
first sensing means SL located near and coupled to said oscillator means for independently sensing the distance from said animal skin and for producing a corresponding output signal $V_{SL}$;
second sensing means SR located near and coupled to said oscillator means for independently sensing the distance from said animal skin and for producing a corresponding output signal $V_{SR}$; and
third sensing means SB located near and coupled to said oscillator means for independently sensing the distance from said animal skin and for producing a corresponding output signal $V_{SB}$,
wherein said first, second and third sensing means each comprise:
a reference capacitance,
a capacitance varying with said sensed distance, said reference and variable capacitances each connected to receive said alternating signal, and
an amplifier circuit responsive to the voltage drop across said reference capacitance for converting said voltage drop to a corresponding output signal;
wherein said oscillating means includes:
an operational amplifier generating a square wave at an output terminal thereof; and
a stabilizing circuit coupled to said operational amplifier square wave output, including a first zener diode D1 having a cathode operatively coupled to said operational amplifier output terminal and a second zener diode 6V2 having an anode operatively coupled to said operational amplifier output terminal.

* * * * *